United States Patent
Huffman et al.

(10) Patent No.: US 9,449,299 B2
(45) Date of Patent: Sep. 20, 2016

(54) DIGITAL CONTENT SUBSCRIPTION CONDITIONING SYSTEM

(75) Inventors: Lon Joseph Huffman, Danville, CA (US); Dinghwa Connie Ko, San Francisco, CA (US); Ta Chih Minh Tsai, Monterey Park, CA (US)

(73) Assignee: Accenture Global Services Limited, Dublin (IE)

( * ) Notice: Subject to any disclaimer, the term of this patent is extended or adjusted under 35 U.S.C. 154(b) by 1248 days.

(21) Appl. No.: 12/121,913

(22) Filed: May 16, 2008

(65) Prior Publication Data

US 2008/0215467 A1    Sep. 4, 2008

Related U.S. Application Data

(63) Continuation of application No. 09/940,276, filed on Aug. 27, 2001, now Pat. No. 7,505,936.

(60) Provisional application No. 60/290,564, filed on May 11, 2001.

(51) Int. Cl.
*G06Q 40/00* (2012.01)
*G06Q 10/10* (2012.01)
*G06Q 30/02* (2012.01)
(Continued)

(52) U.S. Cl.
CPC .............. *G06Q 10/10* (2013.01); *G06Q 30/02* (2013.01); *G06Q 30/04* (2013.01); *G06Q 40/00* (2013.01); *G06Q 40/04* (2013.01); *G06Q 40/12* (2013.12); *H04M 15/00* (2013.01); *H04M 15/44* (2013.01); *H04M 2215/0104* (2013.01)

(58) Field of Classification Search
CPC ....................................................... G06F 17/60
USPC ..... 705/14, 30, 32, 51, 26, 1, 14.14, 34, 40; 713/164, 168, 194; 726/1, 2, 3, 4, 12, 726/26, 27
See application file for complete search history.

(56) References Cited

U.S. PATENT DOCUMENTS 5,508,731 A    4/1996  Kohorn
5,794,221 A    8/1998  Egendorf
(Continued)

FOREIGN PATENT DOCUMENTS

CA    2264819    3/1998
EP    1041823    10/2000
(Continued)

OTHER PUBLICATIONS

"4i Content Management," http://www.documentum.com/products/content/index.html, Jun. 21, 2000, Documentum, Inc., 2 pp.
(Continued)

*Primary Examiner* — Rokib Masud
(74) *Attorney, Agent, or Firm* — Fish & Richardson P.C.

(57) ABSTRACT

Allocating subscription revenue may involve receiving usage information relating to usage of digital content (e.g., music, movies, text, images, games) in a digital content aggregation, identifying a coefficient relating to a subset of digital works in the digital content aggregation (e.g., author-specific subjective or objective factors, popularity ranking, historical factors, performance factors, etc.), and generating a revenue allocation for the digital content based on the coefficient and the usage information.

23 Claims, 7 Drawing Sheets (51) Int. Cl.
*G06Q 30/04* (2012.01)
*G06Q 40/04* (2012.01)
*H04M 15/00* (2006.01)

(56) References Cited

U.S. PATENT DOCUMENTS

| | | | |
|---|---|---|---|
| 5,802,296 | A | 9/1998 | Morse et al. |
| 5,848,415 | A | 12/1998 | Guck |
| 5,940,504 | A | 8/1999 | Griswold |
| 6,026,388 | A | 2/2000 | Liddy et al. |
| 6,029,145 | A | 2/2000 | Barritz et al. |
| 6,041,316 | A | 3/2000 | Allen |
| 6,084,865 | A | 7/2000 | Dent |
| 6,112,181 | A | 8/2000 | Shear et al. |
| 6,119,229 | A | 9/2000 | Martinez et al. |
| 6,135,646 | A | 10/2000 | Kahn et al. |
| 6,161,107 | A | 12/2000 | Stern |
| 6,189,008 | B1 | 2/2001 | Easty et al. |
| 6,202,056 | B1 | 3/2001 | Nuttall |
| 6,219,788 | B1 | 4/2001 | Flavin et al. |
| 6,226,618 | B1 | 5/2001 | Downs et al. |
| 6,229,533 | B1 | 5/2001 | Farmer et al. |
| 6,236,994 | B1 | 5/2001 | Swartz et al. |
| 6,263,313 | B1 | 7/2001 | Milsted et al. |
| 6,345,256 | B1 | 2/2002 | Milsted et al. |
| 6,356,903 | B1 | 3/2002 | Baxter et al. |
| 6,418,467 | B1 | 7/2002 | Schweitzer et al. |
| 6,502,131 | B1 | 12/2002 | Vaid et al. |
| 6,839,680 | B1 | 1/2005 | Liu et al. |
| 6,842,782 | B1 | 1/2005 | Malik et al. |
| 6,854,009 | B1 | 2/2005 | Hughes |
| 6,857,020 | B1 | 2/2005 | Chaar et al. |
| 6,898,618 | B1 | 5/2005 | Slaughter et al. |
| 6,904,449 | B1 | 6/2005 | Quinones |
| 6,917,979 | B1 | 7/2005 | Dutra et al. |
| 7,092,914 | B1 | 8/2006 | Shear et al. |
| 7,110,961 | B1* | 9/2006 | Goino .............. G06Q 30/02 705/14.4 |
| 7,249,139 | B2 | 7/2007 | Chuah et al. |
| 7,505,936 | B2 | 3/2009 | Huffman et al. |
| 2001/0011303 | A1 | 8/2001 | Chang et al. |
| 2001/0037316 | A1 | 11/2001 | Siloh |
| 2001/0049632 | A1 | 12/2001 | Rigole |
| 2002/0055912 | A1 | 5/2002 | Buck |
| 2002/0077988 | A1 | 6/2002 | Sasaki et al. |
| 2002/0087674 | A1 | 7/2002 | Guilford et al. |
| 2002/0107809 | A1 | 8/2002 | Biddle et al. |
| 2002/0116293 | A1 | 8/2002 | Lao et al. |
| 2002/0143819 | A1 | 10/2002 | Han et al. |
| 2002/0143920 | A1 | 10/2002 | Dev et al. |
| 2002/0152297 | A1 | 10/2002 | Lebourg et al. |
| 2003/0004844 | A1 | 1/2003 | Hueler |
| 2003/0023564 | A1 | 1/2003 | Padhye et al. |
| 2003/0046395 | A1 | 3/2003 | Fleming et al. |
| 2003/0053448 | A1 | 3/2003 | Craig et al. |
| 2003/0093798 | A1 | 5/2003 | Rogerson |
| 2003/0172012 | A1* | 9/2003 | Otsuka ............ G06Q 10/06393 705/32 |
| 2003/0225696 | A1 | 12/2003 | Niwa |
| 2004/0039704 | A1 | 2/2004 | Gilliam et al. |
| 2004/0049482 | A1* | 3/2004 | Brechter ............... G06Q 10/10 |
| 2004/0064471 | A1 | 4/2004 | Brown et al. |
| 2005/0171958 | A9 | 8/2005 | Cheng et al. |
| 2009/0265278 | A1 | 10/2009 | Wang et al. |

FOREIGN PATENT DOCUMENTS

| | | |
|---|---|---|
| GB | 2 260 007 | 3/1993 |
| WO | WO96/27155 | 9/1996 |
| WO | WO 99/31610 | 6/1999 |
| WO | WO00/42555 | 7/2000 |
| WO | WO 01/11511 | 2/2001 |
| WO | WO 01/28141 | 4/2001 |
| WO | WO01/44907 | 6/2001 |
| WO | WO 01/69903 | 9/2001 |

OTHER PUBLICATIONS

"About Documentum," http://www.documentum.com/company/about/index.html, Jun. 21, 2000. Documentum, Inc.
"Content management made strategic," Feb. 19, 2001, *Infoworld*, p. 48.
"Documentum 4i eBusiness Edition starts with:," http//www.documentum.com/products/content/internet-4i/doc4i.html, Jun. 21, 2000, Documentum, Inc., 2 pp.
"Documentum 4i Integrators," http://www.documentum.com/products/content/internet-4i/integrators.html, Jun. 21, 2000 Documentum, Inc., 1 p.
Documentum e-Business Development Tools,: http://www.documentum.com/products/content/internet-4i/devstudio.html, Jun. 21, 2000, Documentum, Inc., 2 pp.
"Documentum eConnectors™," http://www.documentum.com/products/content/internet-4i/econnectors.html, Jun. 21, 2000 Documentum, Inc., 2 pp.
"Documentum eDeploy™," http://www.documentum.com/produts/content/internet-4i/edeploy.html, Jun. 21, 2000, Documentum, Inc., 1 p.
"Documentum FrameLink Product Suite," http://www.documentum.com/products/content/internet-4i/framelink.html, Jun. 21, 2000, Documentum, Inc., 1 p.
"Glossary," http://www.xchange.com/resource/gloassary.asp, Jun. 21, 2000, Exchange Applications, 5 pp.
"IMRglobal," http://www.ca.imrglobal.com/contact.htm, Jun. 21, 2000, 2 pp.
"Knowledge Organizer: Organize your intranet content the way you organize your business," http://www.verity.com/products/ko/, Verity® Knowledge Organizer®, Product Overview, Oct. 13, 2000, Verity, Inc., 2 pp.
"Making Clicks and Mortor Click™: Extending relationship business' expertise into e-markets.," 2000, Black Pearl, Inc., 2 pp.
"Open Market e-Business Suite," Oct. 13, 2000, http://www.openmarket.com/egi-.../Render&c=Collection&cid=OM176UJ9KYB&live=tru, 2 pp.
"Step 1: Identify your most profitable customers," http://www.xchange.com/resource/step1.asp, Jun. 21, 2000, Exchange Applications, 1 p.
"Step 2: Personalize your marketing efforts through technology," http://www.xchange.com/resource/step.asp, Jun. 21, 2000, Exchange Applications, 1 p.
"Step 3: Evaluate the results of your strategies," http://www.xchange.com/resource/step3.asp, Jun. 21, 2000, Exchange Applications, 1 p.
"ThomasTech Content Management Solutions," http://www.thomastechsolutions.com.content.htm, Oct. 13, 2000, Thomas Technology Solutions, Inc., 3 pp.
"U.K.'s second largest retailer, Great Universal Stores, purchases VALEX software to increase relevance and impact of marketing campaigns," Jun. 21, 2000, http://www.xchange.com/news/press_releases/1999/1999-07-19-02.asp, Exchange Applications, pp.
"V/5 E business Platform Architecture," http://www.vignette.com/CDA/Site/0,2097,1-1-731-1191-733-1196,FF.html, Jun. 21, 2000, Vignette Corporation, 4 pp.
Vignette Application Power Pack™, Jun. 21, 2000, Vignette, 2 pp.
"What is eCRM?," http://www.xchange.com/resource/default.asp, Jun. 21, 2000, Exchange Applications, 1 p.
Berg, T., Drakos, N., Valdes, R., "Web-Site Deployment and Operations," Jan. 8, 1999, Gartner Group, Inc., 76 pp.
Black Pearl—Main Body, http://blackpearl.com/solutions/solutions_body.html, Jun. 21, 2000, Black Pearl, Inc. 3 pp.
Black Pearl—Main Body, http://www.blackpearl.com/company/company_body.html, Jun. 21, 2000, Black Pearl, Inc., 2 pp.
Foster, C., "Content Management: Defining Requirements for Competitive Advantage," Mar. 1999, Jupiter Strategic Planning Services/SOS99-21, pp. 1-22.
Ingalls, J., Lundy, J., "Where Is Output Headed? Ten Key Trends," Jan. 12, 1999, Gartner Group, Inc., 5 pp.
Jee et al., "A DAVIC Video-on-Demand System Based on the RTSP", *IEEE Comput. Soc*, pp. 231-238, (2001).

(56) References Cited

OTHER PUBLICATIONS

Kirzner, R., "Managing Content: The Key to Success in Web Business," Jun. 1999, *International Data Corporation*, pp. 1-12.
Knox, R., "Multichannel Output: Process Changes on Horizon," Apr. 20, 1999, Gartner Group Inc., 4 pp.
Robins, S., Mahony, C., "Web Content Management for Pervasive Content," The Yankee Group, Oct. 13, 2000 pp. 1-26.
Sanborn, S., "Content management expands its role," Feb. 19, 2001, *Infoworld*, p. 38.
Seeley, C., Dietrick, B., "Crafting A Knowledge Management Strategy, Part two. Marrying content with IT applications," *Knowledge Management Review*, Issue 12 Jan./Feb. 2000, pp. 20-23.
Web Content Management Strategies, Technologies and Markets, 2000, Ovum Ltd., pp. 1-230.
White, A. S., "Managing the Development and Delivery of Content." May 1999, *International Data Corporation*, pp. 1-15.
Whitepaper Request, "Evolving to eCRM: How to optimize interactive relationships between you and your customers," http://www.xchange.com/resource/whitepaper.asp, Jun. 21, 2000, Exchange Applications, 1 p.
Canadian Examiner Veeresh Nadarajan, Canadian Office Action for Application No. 2,447,087, dated Dec. 2, 2011 (6 pages).
Canadian Examiner Veeresh Nadarajan, Canadian Office Action for Application No. 2,447,087, dated Aug. 28, 2013 (3 pages).
"Licensing the User: The SOCAN license and what it can mean to your business," Wayback Machine Internet Archive (Dec. 17, 2000) at URL: http://web.archive.org/web/20001217223600/http://www.socan.ca/en/licensing/lic-100.html, published Oct. 1, 2000, 2 pages.
Canadian Office Action for Application No. 2,447,087, dated Feb. 17, 2015, 4 pages.
International Search Report and Written Opinion in International Application No. PCT/US02/14946, dated Mar. 11, 2003, 1 page.
International Preliminary Examination Report issued in International Application No. PCT/US02/14946, Sep. 9, 2004, 3 pages.
Canadian Office Action in Application No. 2,447,087, dated Apr. 11, 2016, 6 pages.

\* cited by examiner

DIGITAL CONTENT SUBSCRIPTION CONDITIONING SYSTEM

RELATED APPLICATIONS

This application is a continuation of U.S. patent application Ser. No. 09/940,276, filed Aug. 27, 2001, which claims the benefit of U.S. Provisional Patent Application Ser. No. 60/290,564, filed on May 11, 2001, each of which are hereby incorporated by reference.

BACKGROUND

This application relates to the allocation of digital library subscription revenue generated, for example, by the distribution of digital content such as music, movies, images, and texts.

The distribution of digital content such as music, movies, images and the like over the Internet has become pervasive. Distribution services include "peer-to-peer" systems in which individual users store content on their local computers and then make that content available to other users for download either on a fee-basis or free of charge, and "digital service provider" (DSP) systems in which a central authority, the DSP, hosts digital content (e.g., songs) owned by one or more content owners (e.g., record labels, individual artists, licensing companies) on a central system and then selectively allows individual users, or subscribers, to download or otherwise to access the digital content of interest.

In general, DSP systems operate on a fee-basis and will charge subscribers using any of several different mechanisms. In a flat rate subscription arrangement, the DSP will charge a user a flat fee for unlimited access to one or more libraries of digital content. In a usage-based arrangement, users will be charged based on actual use, for example, a predetermined fee for each download or other access to each item of digital content. Alternatively, a hybrid system can be used in which a subscriber is charged a flat subscription fee for some content but is charged on a usage-basis for other content.

In addition, a subscriber may be charged different rates depending on the method of accessing the digital content. For example, a subscriber who downloads a song in MP3 format to a local computer, thereby retaining a copy of it for future use or copying, might be charged a larger fee than if the subscriber merely accessed the content in a one-time use manner (e.g., as streaming media).

In general, a subscription is an agreement to exchange access to digital content during specified periods of time for a fee, regardless of the method of access or whether additional charges apply for particular usage of the digital content. Thus, a licensing agreement between a DSP and a content provider in which the DSP pays a flat fee for the right to distribute digital content from a particular digital library, or content aggregation, is also a subscription agreement. A portion of the subscription fee, which in this case is the licensing fee paid by the DSP, typically is allocated in some fashion to those with rights and royalties in the digital content in the digital library.

Conventional subscription-based systems for electronic delivery of digital content typically allocate subscription revenues to authors on a pro rata basis. Moreover, these conventional subscription-based systems for electronic delivery of digital content typically are not integrated with existing rights and royalty systems.

SUMMARY

The present inventors recognized that conventional royalty allocation practices tended to improperly compensate anchor artists primarily responsible for generating subscription sales of digital content to DSPs. Moreover, the inventors recognized that it may be advantageous to integrate a royalty allocation system with content delivery systems for the allocation of rights and royalties in the distribution of digital media. Accordingly, the inventors developed digital content subscription conditioning systems and techniques that may be integrated with delivery systems and which more fairly compensate content creators in view of market forces. Implementations of the digital content subscription conditioning systems and techniques may include various combinations of the following features.

In one aspect, a computer-implemented method of allocating digital content subscription revenue, the method includes receiving usage information relating to usage of digital content in a digital content aggregation, identifying a coefficient relating to a subset of digital works in the digital content aggregation, and generating a revenue allocation for the digital content based on the coefficient and the usage information. The method may further include receiving digital asset metadata from a digital asset management system. The coefficient may be a preset value corresponding to a subjective or objective measure of marketability for the digital content, or it may be derived from a measure of usage for digital content calculated using usage information from a plurality of digital service providers.

The identification of the coefficient may involve retrieving the coefficient from a contract data repository, and may also involve identifying multiple conditioning coefficients, each comprising a preset value. The one or more conditioning coefficients may correspond to an author(s) of digital content or other content grouping factor. Moreover, the generation of the revenue allocation may involve various calculations, such as assigning a weight to each conditioning coefficient, averaging conditioning coefficients to create a composite conditioning coefficient for each digital work, multiplying the composite conditioning coefficient by the usage information, and normalizing data.

In another aspect, a machine-readable medium has stored thereon one or more sequences of instructions for causing one or more machines to perform operations as described above.

In yet another aspect, a data processing system for allocating digital content subscription revenue includes a processor, an input/output system, a database, and a revenue conditioning server configured to calculate revenue allocations for digital content in an aggregation of digital content by allocating earned revenue for the aggregation as a whole based upon actual usage of the digital content and a conditioning coefficient. The database may include a submission database, a subscription agreement and conditioning coefficient database, and a server database.

The data processing system may further include a network server configured to present a graphical user interface for receiving submissions and managing the subscription agreement and conditioning coefficient database. The revenue conditioning server may be data exchange software capable of translating output data into a destination-specific format. The revenue conditioning server also may be a back-end server having document routing, mapping and transformation, transaction logging, subscriber management, security certification, and workflow orchestration elements.

One or more of the following advantages may be provided. The systems and techniques described may result in an ability to apply customized business and revenue models to compensation calculation, contract flexibility by allowing artist stature negotiation, and enhanced protection of revenue and rights of authors. The systems and techniques described also may result in an increase in ability to retain anchor artists, expansion of revenue channels by promoting and driving music sales over computer networks, and leveraging of existing rights and royalty systems to achieve cost efficiency. The systems and techniques described also may result in a uniform interface between content providers and digital service providers, enhanced online digital content distribution, support for emerging business and revenue models, and enablement of trending as well as marketing, financial and executive level reporting.

The details of one or more embodiments are set forth in the accompanying drawings and the description below. Other features and advantages will be apparent from the description and drawings and from the claims.

DETAILED DESCRIPTION

In the description that follows, like numerals or reference designators will be used to refer to like parts or elements throughout. For ease in illustration, aspects and features are disclosed and described herein in terms of Web-based technologies, such as Extensible Markup Language (XML), and particular database models, such as those for use with the music industry. However, the systems and techniques described here may be implemented using different development platforms and/or additional features and functions. For example, alternative implementations may include distribution of alternative and/or additional digital content, including interactive games, movies, images and texts, use of different languages, and use of alternative systems and software, such as Unix based systems or use of Oracle database software. Moreover, alternative network environments are also possible, including proprietary wired and/or wireless networks.

A subscription conditioning system conditions subscription revenue by allocating it among authors of digital content based upon the value of each author's digital content. Authors are the creators of digital content, which comprises discrete digital works known as digital assets. These authors include authors of books, musical artists, motion picture producers, interactive games producers, and other types of content generators. Conditioning subscription revenue is a form of revenue allocation using predefined revenue allocation models. For example, in the music industry, once subscription revenue has been conditioned, the resulting revenue allocations may be automatically compiled with other royalty streams, such as those generated by brick-and-mortar music sales using UPCs (Universal Product Codes) or ISRCs (International Standard Recording Codes), by integrating the subscription conditioning system with existing rights and royalty systems.

The value of a particular author's digital works may be determined using actual usage data and one or more conditioning coefficients. Usage data may include number of downloads of particular digital works in a given period, as reported by DSPs. Conditioning coefficients comprise predefined values that are factored into the calculation of an asset's revenue allocation. Coefficient values may be assigned or dynamically generated based on several factors, such as asset performance, artist stature and market trends. By using actual usage data and a conditioning coefficient in allocating subscription revenues, a subscription conditioning system enables proper compensation of the various anchor artists primarily responsible for generating subscription sales of digital content libraries.

Figure 1:
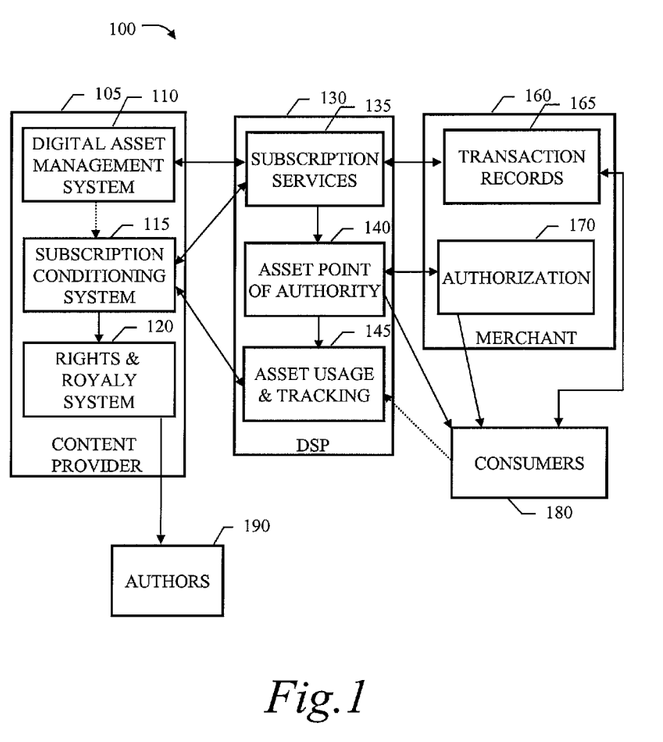
FIG. 1 is a block diagram illustrating an electronic digital content delivery system.

FIG. 1 is a block diagram illustrating an electronic digital content delivery system 100, which may include at least one content provider 105 and at least one DSP 130. In a typical implementation, multiple content providers 105 and multiple DSPs 130 are connected via a computer network with multiple consumers 180. The consumers 180 access the DSPs using a network access device, such as a laptop, personal computer, personal digital assistant (PDA), mobile phone, electronic book device, or any device capable of communicating using a network protocol on the computer network.

The content provider 105 may include a digital asset management system 110, for managing digital assets, a subscription conditioning system 115, for conditioning subscription revenue, and a rights & royalty system 120, for maintaining digital rights information and distributing royalties. These sub-parts of each content provider 105 may be located in separate computing environments and be connected via a computer network. Moreover, a single subscription conditioning system 115 and a single rights & royalty system 120 may be shared by multiple content providers.

Alternatively, a separate subscription conditioning system 115 and a rights & royalty system 120 may be provided for each type of digital content. Thus, for example, a digital music subscription conditioning system and a digital music rights & royalty system may be shared by multiple content providers by being in communication with multiple asset management systems, and an electronic book subscription conditioning system and an electronic book rights & royalty system also may be shared by the multiple content providers by being in communication with multiple asset management systems. Other combinations of the various elements are possible.

The DSP 130 includes a subscription services module 135, an asset point of authority 140, and an asset usage & tracking module 145. The subscription services module 135 communicates with the digital asset management system 110, the subscription conditioning system 115 and the asset point of authority 140. In particular, the subscription services module 135 may provide the subscription conditioning system 115 with subscription revenue information across all subscription plans. For example, the subscription services module 135 may provide licensing fee information to the subscription conditioning system 115 for all digital libraries licensed from a content provider 105 through a digital asset management system 110. The subscription services module 135 also may provide content aggregation data for any digital library subsets/aggregates created within the asset point of authority 140.

The asset point of authority 140 may provide digital assets/content, such as digital music, e-books, etc., to requesting consumers 180. The asset usage & tracking module 145 stores usage information for the consumers 180 and may communicate this usage information to the subscription conditioning system 115. For example, in a music industry implementation, the asset usage & tracking module 145 may provide the subscription conditioning system 115 with track-level ISRC usage data.

The subscription conditioning system 115 allocates subscription revenues based upon, at least in part, digital content usage and/or predefined conditioning coefficients. The resulting revenue allocation information is communicated to the rights & royalty system 120, which then calculates the royalties for authors 190 of the digital assets.

The rights & royalty system 120 also may calculate additional revenue allocations. In addition, the rights & royalty system 120 may cause royalty payments to be made through an appropriate electronic transfer of funds.

The subscription conditioning system 115 and the rights & royalty system 120 may be merged into a single system.

One or more merchants 160 may provide facilities for sale of digital content in a hard copy form to consumers 180. Each merchant 160 may be coupled with the electronic delivery system 100 through a transaction records module 165 and an authorization module 170. The transaction records module 165 may provide the DSP 130 with proof of purchase information regarding particular digital content, and the authorization module 170 may provide authorization for electronic delivery of the same digital content and/or additional digital content to consumers 180.

Thus, for example, a consumer 180 may purchase a new Compact Disc (CD) from a merchant 160. The data from this purchase is included in the transaction records module 165 and allows that same consumer 180 to download any of the tracks on the purchased CD from the DSP 130, through the authorization module 170. The transfer of this purchase data from the transaction records module 165 to the subscription services module 135 may also sign up the consumer 180 to a promotional content aggregation, thus allowing the consumer 180 to download any of a set of tracks, currently being promoted, for a limited time, from the DSP 130.

Alternatively, or additionally, a consumer 180 may download or stream digital content directly from the DSP 130. The DSP 130 pays one or more subscription fees to license the rights to distribute the digital works of one or more digital libraries managed by the digital asset management system 110. The consumers 180 download digital content from the DSP 130 through the asset point of authority 140. Usage data for these downloads may be tracked by the asset usage & tracking module 145. The subscription services module 135 and the asset usage & tracking module 145 report to the subscription conditioning system 115. The subscription conditioning system 115 allocates the one or more subscription fees according to a selected allocation model, and reports the resulting allocations to the rights & royalty system 120.

Alternatively, all electronic delivery of digital content from the DSPs 130 must go through a merchant 160. Moreover, in a peer to peer model, the DSP may be used as a directory naming service to track asset usage. For example, the subscription conditioning system 115 may receive digital asset metadata from the digital asset management system 110, and the subscription conditioning system 115 may transmit digital asset and per-asset cost data for each licensee to the DSP 130. The metadata is the information used to facilitate calculation of rights and royalties and assignment of content aggregates. These processes are discussed in greater detail below in connection with FIGS. 4A, 4B, 5A and 5B.

Figure 2:
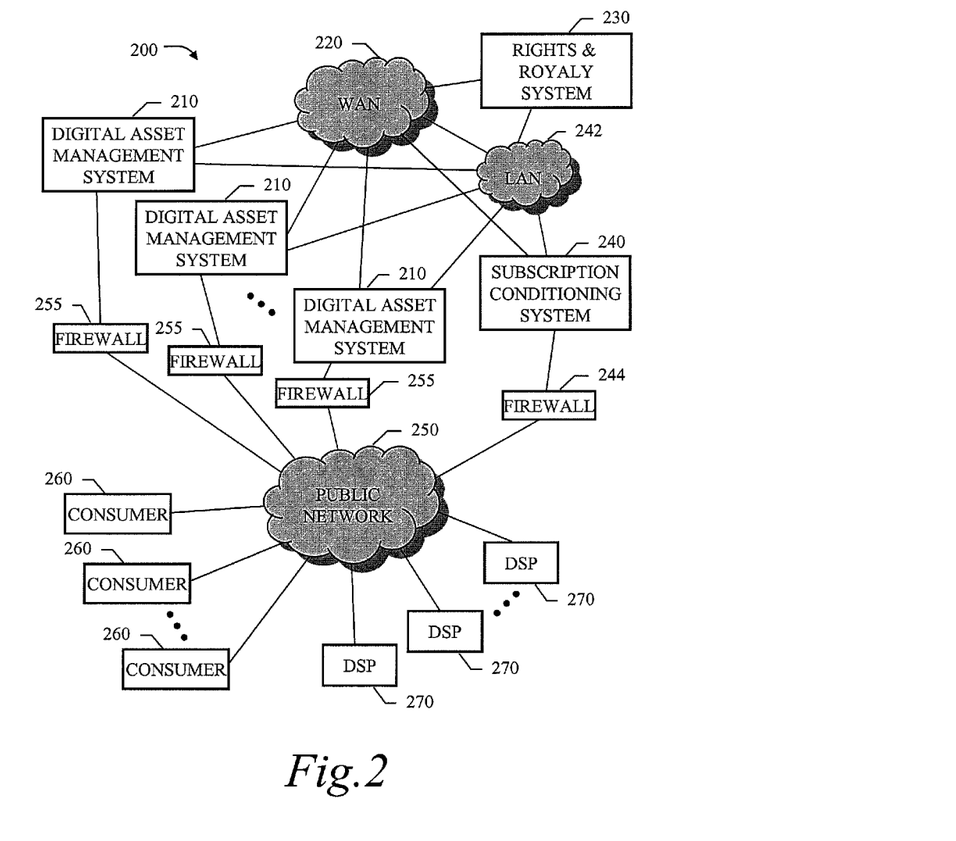
FIG. 2 is a block diagram illustrating an exemplary environment for a subscription revenue conditioning system.

FIG. 2 is a block diagram illustrating an exemplary environment 200 for a subscription revenue conditioning system 240. Digital asset management systems 210 may be communicatively coupled with a rights & royalty system 230 through a wide area network (WAN) 220, (utilizing firewalls if needed) and/or through a local area network (LAN) 242. The digital asset management systems 210 are also communicatively coupled with DSPs 270 through firewalls 255 and a public network 250, such as the Internet. Consumer devices 260 are communicatively coupled with the DSPs 270 through the public network 250.

A subscription conditioning system 240 is communicatively coupled with the rights & royalty system 230 through the WAN 220 (utilizing a firewall if needed) and/or through the LAN 242. The subscription conditioning system 240 also is communicatively coupled with the DSPs 270 through a firewall 244 and the public network 250. The subscription conditioning system 240 communicates with the DSPs 270 to obtain revenue and usage information.

Subscription information across subscription plans may be managed by a database within the subscription conditioning system 240. Alternatively, this information may be replicated locally from separate contract management systems, which may be part of the asset management systems 210.

Updates to local databases and data usage reports may be made on a periodic basis (e.g., hourly, daily, weekly, monthly, etc.). Subscription contract information between a content provider (e.g., a record company) and a DSP are maintained in a database within the subscription conditioning system 240, thereby allowing validation and verification of revenue.

The DSPs 270 may track usage information on the asset and subscription levels; thus the usage information provided by the DSPs 270 may include downloading and streaming per asset per subscription. This data may be transmitted by the DSPs 270 (e.g., in XML format) to a location where the subscription conditioning system 240 can access it. Any loosely coupled messaging system (e.g., FTP (File Transfer Protocol), HTTP (Hypertext Transfer Protocol), MSMQ (Microsoft® Message Queuing)) may be used. However, a tightly coupled application-to-application direct integration may be provided.

The subscription conditioning system 240 communicates with the rights & royalty system 230 to supply revenue allocation information that has been conditioned by a particular subscription revenue allocation model using the usage information and/or assigned conditioning coefficients, which are discussed in greater detail below in connection with FIG. 4B. Conditioning coefficients for assets with multiple artists may be assigned by a content provider (e.g., a record company) based on the collective stature of the artists involved, and the data provided to the rights & royalty system 230 may be in the form of revenue allocation per asset (e.g., per ISRC track).

Moreover, data provided by the subscription conditioning system 240 is sent in XML format to a location where the rights & royalty system 230 can access it. As before, any loosely coupled messaging system may be used. Alternatively, a tightly coupled application-to-application direct integration may be provided.

The communication protocols between the subscription conditioning system 240 and the rights & royalty system 230 and the DSPs 270 may include appropriate error handling, backup and recovery processes and security features.

Variations of the example environment described above are also possible. For example, a peer-to-peer exchange service may play the role of one of the DSPs 270 described above, and multiple rights & royalty systems 230 may be communicatively coupled with the subscription conditioning system 240 through one or more LANs and/or WANs.

Figure 3:
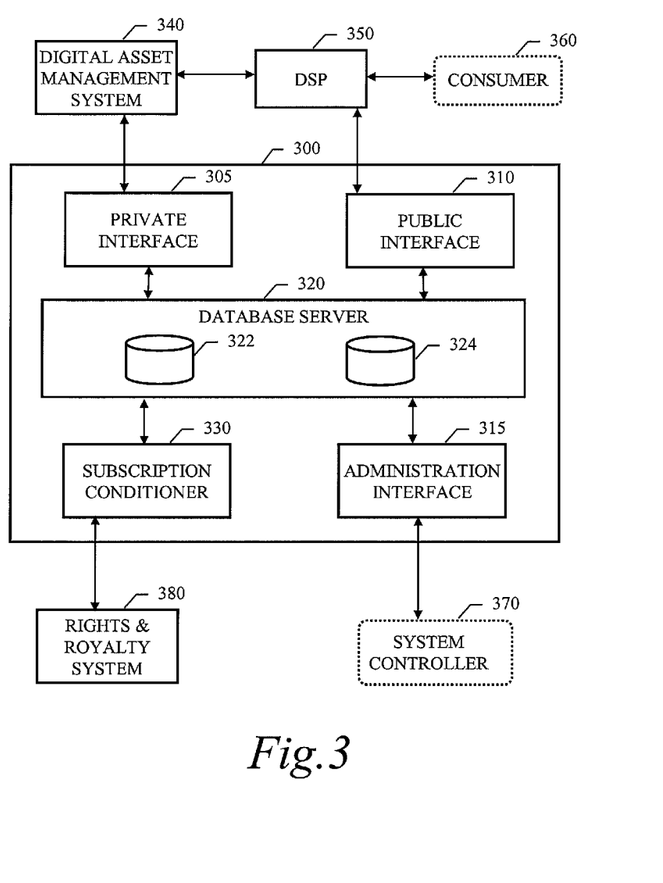
FIG. 3 is a block diagram illustrating an example subscription revenue conditioning system.

FIG. 3 is a block diagram illustrating an example subscription revenue conditioning system 300 in communication with one or more digital asset management systems 340 and one or more DSPs 350 in a manner as described previously. The DSPs 350 deliver digital content to consumers 360 and report subscription and asset usage data to the subscription conditioning system 300. In some cases, the usage data will come directly from a digital asset management system 340 instead of a DSP 350.

The subscription conditioning system 300 includes a private interface 305 for communicating with digital asset management systems 340 and a public interface 310 for communicating with DSPs 350. In a music industry application, the digital asset management systems 340 may provide asset usage by subscription by artist by track through the private interface 305. The DSPs 350 distribute digital music to consumers 360, handle revenue collection from consumers 360 and submit revenue by subscription by track information to the subscription conditioning system 300 through the public interface 310. More generally, the private interface 305 may be used to communicate with any outside system that is within the firewall that protects a rights & royalty system 380 from a public network.

The public interface 310 and the private interface 305 provide a secure and manageable way for the subscription conditioning system 300 to collect data from an external application. In one implementation, this involves data sent in XML format as discussed above. A Web-based system may be used to provide authorization and authentication of user access and to manage the acceptance and storage of revenue and usage data. This type of Web-based implementation can help in bypassing security issues when communicating with servers outside of the firewall.

The subscription conditioning system 300 may store subscription revenue and usage data along with contract information between DSPs and content providers in one or more databases managed by a database server 320 (e.g., an SQL server). The subscription conditioning system 300 also includes an administrative interface 315 and a subscription conditioner 330. The administrative interface 315 enables a system controller 370 to enter and manage all subscription contracts stored within the subscription conditioning system 300. The administrative interface 315 may utilize a Web front-end to provide a thin client solution without compromising functionality.

File submissions to the subscription conditioning system (SCS) 300 may be in one of several forms, including XML files, flat files, excel files, direct integration, and distributor feeds. The approach used for each submission is based on the location of the source system and its security provisions. For example, in a Web-based submission approach, an automated process is triggered by the SCS 300 to pull the usage data through a public network via HTTP. Alternatively, users at remote sites drive the submission process and are allowed to communicate any issues via e-mail. The sending and processing of data is automated, and notification of any incorrect data is provided by automatically generated e-mails.

Data exchange may be implemented using a messaging system approach, such as by using Microsoft BizTalk, or other middleware/back-end server. BizTalk server is data exchange software available from Microsoft Corporation, located at One Microsoft Way Redmond, Wash. 98052-6399. Thus, the subscription conditioner 330 may be implemented using BizTalk, COM+ (an extension to Microsoft's Component Object Module software), database and Web-based front-end components. The BizTalk server includes appropriate document routing, mapping & transformation, transaction logging, subscriber management, security certification, and workflow orchestration elements.

The database server 320 manages a submission database 322, and an SCS database 324. DSPs 350 submit revenue and possibly usage data to the SCS 300 through a submission website having authentication, authorization, submission management, approval and reporting components. Digital asset management systems 340 submit asset identification information and possibly usage data through a polling system having scheduler and extractor modules. A system controller 370 manages the SCS 300 using an administrative interface 315 portion of the website. Completed royalty calculations are sent to the rights & royalty system 380. In this fashion, the SCS 300 may provide individual asset level revenue distributions for use with traditional rights & royalty systems.

The data model and the user interface utilized by the SCS 300 are preferably flexible enough to accommodate various types of data elements received from DSPs. In the event that critical data is missing, the interface document can be utilized to facilitate the process of obtaining the needed data to properly calculate revenue allocation.

Generally, the inputs to the SCS 300 are asset data and usage data. The inputs may be translated and inserted by a back-end server or middleware (e.g., BizTalk). The output from the SCS 300 is revenue by asset data. The back-end server translates the output into an appropriate format for the rights & royalty system 380. Multiple input and output formats are supported, including XML, EDIFACT (Electronic Data Interchange for Administration, Commerce and Transport, which is the United Nations standard for Electronic Data Interchange (EDI)), X.12 (United States' Accredited Standards Committee standard for EDI), SAP (Simple Asynchronous Protocol), HTTP, FTP, SMTP (Simple Mail Transfer Protocol), Flat Files, and Comma Delimited. With a Biztalk server, data can be formatted into almost any shape or form. Thus, the granularity of the output data from the SCS 300 can made compatible with the rights and royalty system 380 of the client system by changing the internal query structure or by modifying the calculations.

Asset data may include asset information such as asset name, format type, language, asset type, asset identification (e.g., ISRC number for music), duration, artist name, genre, company name, and publisher name. Asset information in the SCS 300 may be synchronized regularly to maintain consistency with the usage data for revenue calculations.

Usage data may include information such as customer identification, contract/licensing identification (e.g., the subscription revenue agreement between the DSP and a record company), total number of downloads, total number of streams, time period start, time period end, subscription based payable (e.g., the subscription fee paid from the DSP to the record company for this contract for this pay period), download based payable (e.g., the total download fee paid from the DSP to the record company for this contract for this pay period), streaming based payable (e.g., the total streaming fee paid from the DSP to the record company for this contract for this pay period, if any), access based payable (e.g., the access fee paid from the DSP to the record company for this contract for this pay period), asset identification (e.g., ISRC number for music), number of downloads, number of streams, download payable (e.g., the revenue received for an asset downloading for this period under this subscription contract between the DSP and the content company), and streaming payable (e.g., the revenue received for an asset streaming for this period under this subscription contract between the DSP and the content company).

The output revenue by asset data may include information such as asset identification (e.g., ISRC number for music), contract identification, customer identification, time period start, time period end, subscription based payable (e.g., the subscription fee allocated to this asset for this contract for this pay period), download payable (e.g., the revenue received for this asset downloading for this period under this subscription contract between the DSP and the content company), streaming payable (e.g., the revenue received for this asset streaming for this period under this subscription contract between the DSP and the content company), and total payable (e.g., the total revenue including the allocated subscription revenue plus download and streaming revenue for the asset).

Figure 4A:
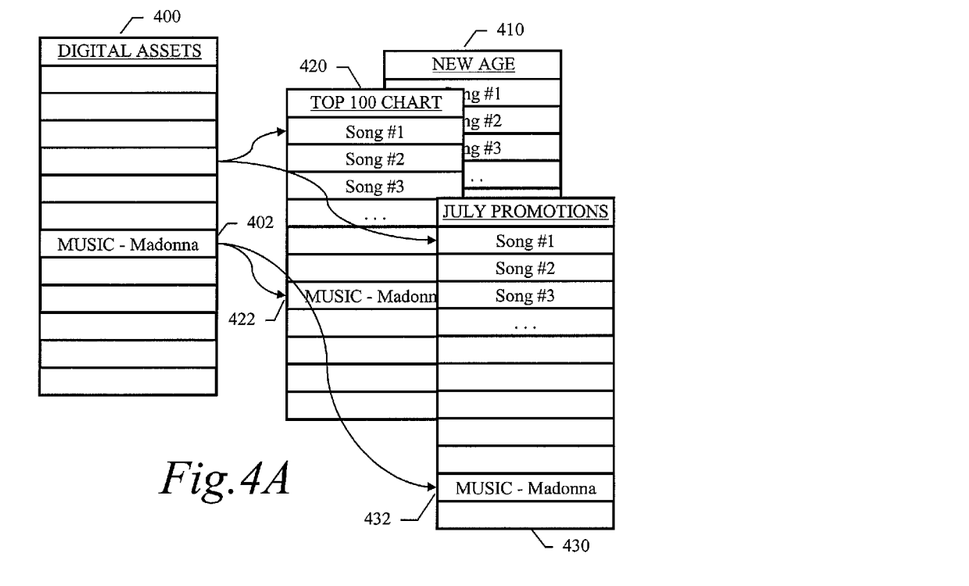
FIG. 4A is a block diagram illustrating flexibility in content aggregation.

FIG. 4A is a block diagram illustrating flexibility in content aggregation. Typically, each content provider has different digital assets. The group of all digital assets for one content provider may be thought of as an aggregation of digital content such as digital assets 400. When entering into licensing agreements with various DSPs, a content provider may license the entire portfolio of digital assets 400, or various subsets of digital content, to generate subscription revenue. These subsets may be thought of as aggregations and are generally defined by some categorization principle. For example, for musical content, digital assets 400 may be separated into a New Age content aggregation 410, a Top One Hundred Chart content aggregation 420 and a July Promotions content aggregation 430.

The same item of digital content may appear in more than one content aggregation, and a content aggregation may be defined by a categorization factor that is dependent upon time. For example, a Madonna music track 402 may appear in both the Top One Hundred Chart content aggregation 420 as track 422 and in the July Promotions content aggregation 430 as track 432. When the month of July ends, the July Promotions content aggregation 430 is terminated, and the Madonna track 402 may or may not appear in a subsequent August Promotions content aggregation. Likewise, track 422 will be removed from the Top One Hundred Chart content aggregation 420 when the Madonna music track 402 falls off the top one hundred chart. This type of dynamic content aggregation definition may be implemented automatically in real time using appropriate computer networking technology.

In this fashion, assets can be mixed and matched to accommodate various consumer tastes and to maximize revenue. Moreover, content aggregations may be ranked to provide an accurate cost figure; thus, promotional content may be cheaper for the promotional period for marketing purposes. This time-varying content aggregation and cost information may be communicated to a subscription conditioning system as metadata from a digital asset management system. Content aggregations may also be created by DSPs themselves, provided usage data is tracked at the level of the content aggregation specified in the licensing agreement.

The subscription conditioning system may support a variety of licensing agreements. For example, a single licensing agreement may cover multiple content aggregations. Thus, subscription conditioning could be performed at the licensing level, the content aggregate level, the asset level, or other levels. The licensing level includes provisions for online access fees, monthly subscription fees, monthly download fees, and monthly streaming fees. The content aggregate level includes provisions for content aggregate access fees, per download charges by volume, and per streaming charges by volume. The asset level includes provisions for per download charges and per streaming charges. Finally, other levels may include revolving content aggregates and audit tracking of licensing agreement changes and updates.

In addition to calculating subscription revenue allocations based upon actual usage data, the subscription conditioning system may also use customized coefficient drivers to create a conditioning coefficient for use in calculating subscription revenue allocations.

Figure 4B:
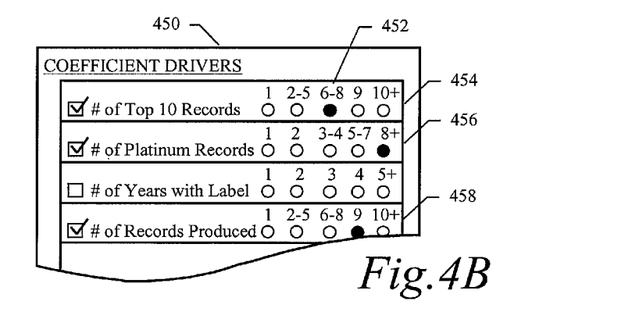
FIG. 4B is an illustration of a graphical user interface for enabling coefficient drivers and setting conditioning coefficient values.

FIG. 4B is an illustration of a graphical user interface for enabling coefficient drivers and setting conditioning coefficient values. A coefficient drivers entry page 450 may be implemented using any number of graphical user interfaces. For example, the coefficient drivers entry page 450 may be part of a Web page created by a Web interface. The coefficient drivers entry page 450 allows a user to enable various coefficient drivers and set conditioning coefficient values for each such enabled coefficient driver.

In general, coefficient drivers are specific to a source of digital content, such as artists in the case of digital music. Each coefficient driver provides information concerning the market value of digital content associated with a particular source. For example, in the music industry, the coefficient drivers would include Top Ten Records 454, Platinum Records 456, Years with Label, Records Produced 458, Popularity Ranking, etc. Once a coefficient driver is enabled, such as by clicking a check box, a conditioning coefficient value may be assigned, such as by clicking a predefined range 452.

Alternatively, enabled coefficient drivers and conditioning coefficient values may be imported from contract provisions in electronically stored contracts. Additionally, conditioning coefficient values may be updated regularly via computer network from data sources stored remotely.

A conditioning coefficient is a predefined value that is factored into the calculation of an asset's revenue allocation. Coefficient values can be assigned or dynamically generated based on several factors, such as asset performance, artist stature and market trends. For example, a single coefficient driver, artist stature, may be used, wherein the value set for the resulting conditioning coefficient is a negotiated term in an artist's contract with a record label. Note that this type of stature coefficient will fluctuate in its revenue allocation effect depending upon a record label's later negotiated statute coefficient with another artist. Thus, periodic reevaluation of coefficients (e.g., monthly, quarterly) may be provided, along with special reports or an outline framework for negotiating coefficients, in order to satisfy artists.

In the example shown on the coefficient drivers entry page 450, three coefficient drivers are enabled and have been assigned a value. The assigned value corresponds to the value or range of values selected from a predetermined scale. Thus, the artist of interest has six to eight top ten records, eight or more platinum records and nine records produced. This corresponds to a conditioning coefficient of three for the Top Ten Records coefficient driver 454, a conditioning coefficient of five for the Platinum Records coefficient driver 456, and a conditioning coefficient of four for the Records Produced coefficient driver 458. Although a linear relationship between selected coefficient setting and conditioning coefficient value is thus described, other mathematical relationships are possible as well.

In some situations, a single digital asset may have multiple authors associated with it. In this case, the conditioning coefficients for each author may be merged or a collective set of conditioning coefficients representing the collective statute of the authors may be assigned.

Figure 5A:
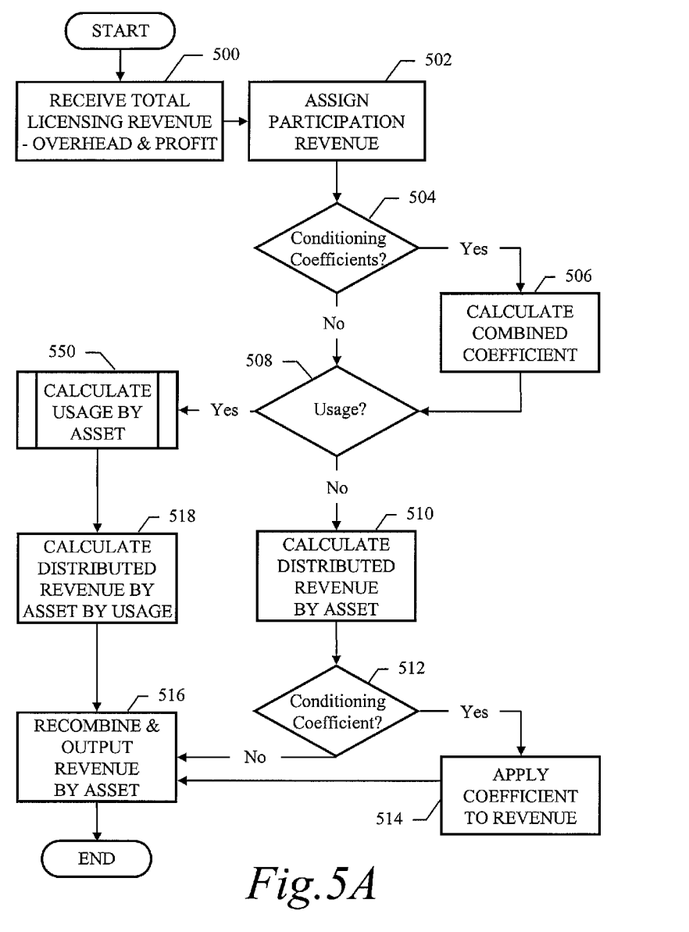
FIGS. 5A and 5B are a logic flow diagram of a subscription revenue conditioning control program executed by a microprocessor in a subscription conditioning system.
Figure 5B:
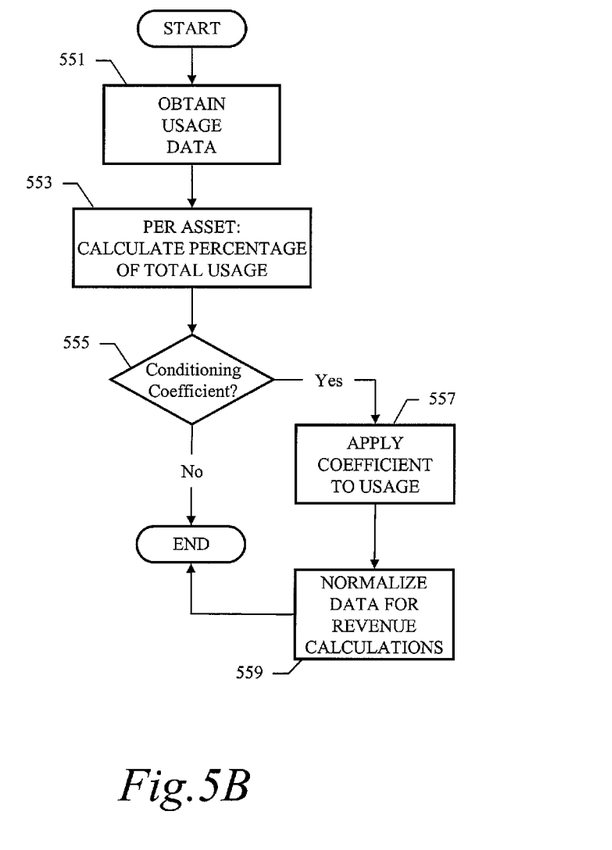

FIGS. 5A and 5B are a logic flow diagram of a subscription revenue conditioning control program executed by a microprocessor in a subscription conditioning system. Referring to FIG. 5A, the control program begins at step 500, in which total subscription revenue less overhead and profits is received. For example, the total subscription revenue may be a subscription licensing fee for a particular content aggregation as reported by a DSP.

Then in step 502, participation revenue is assigned if it has been specified by the subscription agreement covering the particular content aggregation. For example, if a thirty percent participation has been specified, thirty percent of the subscription revenue for the current period is taken off the top to be split evenly among all assets within the particular content aggregation. The remaining seventy percent (or one hundred percent if no participation has been specified) becomes earned revenue for distribution according a selected revenue allocation model.

Following step 502, a check is made as to whether there are multiple conditioning coefficients in step 504. If not, control passes to step 508. If so, control passes to step 506 in which a combined coefficient is calculated for each asset covered by the subscription agreement. This combination of the conditioning coefficients may be performed in a number of ways, such as by averaging the coefficients, including the possibility of using a weighted average. Note that different assets may have different numbers of conditioning coefficients, including some assets only having one conditioning coefficient. Thus the combining in step 504 takes this variation in asset coefficients into account.

Once step 508 is reached, if there are any conditioning coefficients, each asset then has a single conditioning coefficient for subsequent calculations, regardless of whether it is an original conditioning coefficient or a combined conditioning coefficient. In step 508, a check is made as to whether usage allocations are enabled for allocation of subscription revenue. If so, control passes to defined process step 550. If not, control passes to step 510.

The defined process step 550 calculates usage for the current period for each asset covered by the subscription agreement. This defined process step is discussed in greater detail below in connection with FIG. 5B.

In step 510, distributed revenue is calculated for each asset using the earned revenue as the base revenue being distributed. The earned revenue is thus distributed evenly among all assets covered by the subscription agreement. Then in step 512, a check is made whether a conditioning coefficient is in effect. If not, control passes to step 516. If so, control passes to step 514.

In step 514, the single conditioning coefficients for each asset is applied to the distributed revenue for each asset. This involves multiplying each distributed revenue value by each asset's single conditioning coefficient, then normalizing the resulting distributed revenue values for all assets so that the total equals the earned revenue.

In step 516, the distributed revenue values are recombined with the participation revenue for each asset, if present, thereby creating a final distributed revenue value for each asset. These final distributed revenue values are then output to the appropriate rights and royalty system.

Referring now to FIG. 5B, the usage calculations begin with step 551, in which usage data is obtained. The usage data may comprise number of downloads in the current period as reported by the DSP. The following discussion uses the number of downloads as the key usage data, but alternative usage data is also possible. For example, the usage data may be number of streams or a combination of number of downloads and number of streams.

In step 553, a percentage of total usage is calculated for each asset. Thus, the resulting percentage data comprises a percent of total for each asset, wherein the percent of total is one hundred percent times number of downloads for an asset divided by total number of downloads for all assets.

Following step 553, a check is made as to whether a conditioning coefficient is in effect in step 555. If not, the process ends. If so, control passes to step 557. In step 557, the single conditioning coefficients for each asset is applied to the percent of total for each asset. This involves multiplying each percent of total value by each asset's single conditioning coefficient. Then, in step 559, the percentage data is normalized for all assets so that the total equals one hundred percent.

Once the process depicted in FIG. 5B ends, the defined process step 550 from FIG. 5A is completed, and the percent of usage for the current period has been calculated for each asset covered by the subscription agreement. Referring once again to FIG. 5A, following defined process step 550, distributed revenue is calculated for each asset in step 518 using the percentage data and using the earned revenue as the base revenue being distributed. The earned revenue is thus distributed among all assets covered by the subscription agreement based upon actual usage for the current period and based upon the conditioning coefficients, if present.

Following this, control passes to step 516, in which the distributed revenue values are recombined with the participation revenue for each asset, if present, thereby creating a final distributed revenue value for each asset. These final distributed revenue values are then output to the appropriate rights and royalty system.

As can be seen from FIG. 5A and the above discussion, if usage calculations are turned off, and if no conditioning coefficients are set, the process moves directly through steps 500, 502, 504, 508, 510, 512 and 516. This represents a revenue allocation based entirely on participation (i.e. a basic flat rate), which is the traditional approach to subscription revenue allocation. When any of the branches from this central process are taken, a more appropriate revenue allocation for subscription revenues is created.

These various branches create ten possible scenarios for revenue allocation: (1) conditioned basic flat rate, (2) multiple-conditioned basic flat rate, (3) basic usage rate, (4) conditioned basic usage rate, (5) multiple-conditioned basic usage rate, (6) conditioned participation flat rate, (7) multiple-conditioned participation flat rate, (8) participation usage rate, (9) conditioned participation usage rate, and (10) multiple-conditioned participation usage rate. With the many variables available within each of these scenarios, including the nearly unlimited number of conditioning coefficients that may be used, an essentially infinite number of revenue allocation models may be created and handled with the subscription conditioning system described herein.

The logic flow depicted in FIGS. 5A and 5B does not require the particular order shown. Many variations in the order of steps are possible. For example, the normalization steps may be performed at many different places within the overall process. Moreover, performing the steps in sequential order is not required. Thus, multi-tasking and parallel processing may also be used.

Figure 6:
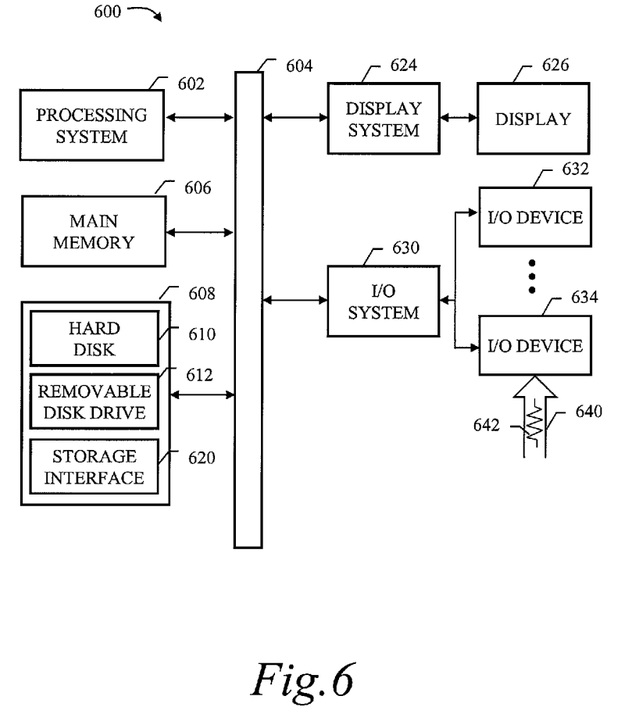
FIG. 6 is a block diagram illustrating an example computer system in which elements and functionality of a subscription conditioning system may be implemented.

FIG. 6 is a block diagram illustrating an example computer system in which elements and functionality of a subscription revenue conditioning system may be implemented. Other computer systems and/or computer architectures are also possible. Referring now to FIG. 6, an exemplary computer system 600 is shown.

The computer system 600 includes a processing system 602, which controls the computer system 600. The processing system 602 includes a central processing unit such as a microprocessor or microcontroller for executing programs, performing data manipulations and controlling tasks in the computer system 600. Moreover, the processing system 602 may include one or more additional processors.

Such additional processors include an auxiliary processor to manage input/output, an auxiliary processor to perform floating point mathematical operations, a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor. These additional processors may be discrete processors or may be built in to the central processing unit.

The processing system 602 is coupled with a communication bus 604. The communication bus 604 includes a data channel for facilitating information transfer between storage and other peripheral components of the computer system 600. The communication bus 604 provides the set of signals required for communication with the processing system 602, including a data bus, address bus, and control bus. The communication bus 604 may comprise any known bus architecture according to promulgated standards. These bus architectures include, for example, industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, IEEE P1394, Universal Serial Bus (USB), Access.bus, Apple Desktop Bus (ADB), Concentration Highway Interface (CHI), Fire Wire, Geo Port, or Small Computer Systems Interface (SCSI).

Computer system 600 includes a main memory 606 and may also include a secondary memory 608. The main memory 606 provides storage of instructions and data for programs executing on the processing system 602. The main memory 606 is typically semiconductor-based memory such as dynamic random access memory (DRAM) and/or static random access memory (SRAM). Other semiconductor-based memory types include, for example, synchronous dynamic random access memory (SDRAM), Rambus® dynamic random access memory (RDRAM), and ferroelectric random access memory (FRAM).

The secondary memory 608 provides storage of instructions and data that are loaded into the main memory 606. The secondary memory 608 may be read-only memory or read/write memory and may include semiconductor based memory and/or non-semiconductor based memory. For example, the secondary memory 608 may comprise a semiconductor based read-only memory (ROM).

The secondary memory 608 may include, for example, a hard disk drive 610 and/or a removable storage drive 612. The removable storage drive 612 represents various non-semiconductor based memories, including but not limited to a floppy disk drive, a magnetic tape drive, an optical disk drive, etc. The removable storage drive 612 reads from and/or writes to a removable storage unit (not shown), such as a magnetic tape, floppy disk, hard disk, laser disk, compact disc, digital versatile disk, etc., in a well-known manner. As will be appreciated, the removable storage unit (not shown) includes a computer usable storage medium having stored therein computer software and/or data.

Alternatively, secondary memory 608 may include other similar means for allowing computer programs or other instructions to be loaded into the computer system 600. Such means may include, for example, a removable storage unit (not shown) and an interface 620. Examples of such include semiconductor-based memory such as programmable read-only memory (PROM), erasable programmable read-only memory (EPROM), electrically erasable read-only memory (EEPROM), or flash memory (block oriented memory similar to EEPROM). Also included are any other removable storage units and interfaces, which allow software and data to be transferred from the removable storage unit to the computer system 600.

The computer system 600 further includes a display system 624 for connecting to a display device 626. The display system 624 may comprise a video display adapter having all of the components for driving the display device, including video random access memory (VRAM), buffer, and graphics engine as desired. The display device 626 may comprise a cathode ray-tube (CRT) type display such as a monitor or television, or may comprise alternative display technologies such as a liquid-crystal display (LCD), a light-emitting diode (LED) display, or a gas or plasma display.

The computer system 600 further includes an input/output (I/O) system 630 for connecting to one or more I/O devices 632-634. The input/output system 630 may comprise one or more controllers or adapters for providing interface functions between one or more of I/O devices 632-634. For example, input/output system 630 may comprise a serial port, parallel port, infrared port, network adapter, printer adapter, radio-frequency (RF) communications adapter, universal asynchronous receiver-transmitter (UART) port, etc., for interfacing between corresponding I/O devices such as a mouse, joystick, trackball, trackpad, trackstick, infrared transducers, printer, modem, RF modem, bar code reader, charge-coupled device (CCD) reader, scanner, compact disc (CD), digital versatile disc (DVD), video capture device, touch screen, stylus, electroacoustic transducer, microphone, speaker, etc.

Input/output system 630 and the one or more of the I/O devices 632-634 provide a communications interface, which allows software and data to be transferred between computer system 600 and external devices, networks or information sources. Examples of this communications interface include a network interface (such as an Ethernet card or wireless modem), a communications port, a PCMCIA slot and card, etc. This communications interface preferably implements industry promulgated architecture standards, such as Recommended Standard 232 (RS-232) promulgated by the Electrical Industries Association, Infrared Data Association (IrDA) standards, Ethernet IEEE 802 standards (e.g., IEEE 802.11 for wireless networks), Fibre Channel, digital subscriber line (DSL), asymmetric digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), Data Over Cable Service Interface Specification (DOCSIS), and so on.

Software and data transferred via this communications interface are in the form of signals, which can be electronic, electromagnetic, optical or other signals capable of being received by this communications interface. For example, software and data transferred via a network interface 634 are in the form of signals 642, which are provided to the network interface 634 via a channel 640, such as wire or cable, fiber optics, a phone line, infrared interface (IR) channel, radio frequency (RF) channel, or other communications channels.

Computer programming instructions (also known as computer programs, software or code) are stored in the main memory 606 and/or the secondary memory 608. Such computer programs, when executed, enable the computer system 600 to perform the features and function described above. In particular, the computer programs, when executed, enable the processing system 602 to perform the features and functions of the subscription conditioning system. Accordingly, such computer programs represent controllers of the computer system 600.

As used herein, the term "machine-readable medium" refers to any media used to provide one or more sequences of one or more instructions to the processing system 602 for execution. Non-limiting examples of these media include the removable storage units discussed previously, a hard disk installed in hard disk drive 610, and a ROM installed in the computer system 600. These machine-readable media are means for providing programming instructions to the computer system 600, or other processing machine.

Modifications and/or reconfigurations of computer system 600 of FIG. 6 are also possible. While various embodiments have been described above, it should be understood that they have been presented by way of example only, and not limitation. For example, although substantial portions of this disclosure discuss subscription revenue in terms of licensing revenue paid by a DSP to a record company, it is understood that subscription revenue is broader and includes subscriptions such as access fees paid by end users for free streaming of digital music from a digital content library, subscription fees paid to an online magazine, subscription fees paid to an online gaming company or advertising agency, multi-tier subscription fees whereby a DSP offers varying levels of accessibility, etc.

What is claimed is:

1. A computer-implemented method comprising:
    determining a subscription revenue associated with an aggregation of content assets;
    determining an earned revenue portion of the subscription revenue;
    receiving coefficient driver values using a user interface, wherein one or more of the coefficient driver values correspond to a number of top ten songs for a creator of one or more of the content assets of the aggregation, a number of platinum records for the creator, a number of years the creator has been with a recording company, or a number of records produced by the creator;
    dynamically generating, by one or more processors, a conditioning coefficient for the one or more content assets of the aggregation using the received coefficient driver values, wherein the conditioning coefficient is a value that is factored into a royalty payment made to the creator of the one or more content assets;
    calculating a distributed revenue portion of the earned revenue portion using the dynamically generated conditioning coefficient; and
    affecting a royalty payment made to the creator of the one or more of the content assets of the aggregation based on the distributed revenue portion.

2. The computer-implemented method of claim 1, wherein the subscription revenue comprises a total subscription licensing fee for the aggregation less overhead and profits.

3. The computer-implemented method of claim 1, wherein determining the earned revenue portion of the subscription revenue comprises:
    calculating, when participation revenue is specified:
        a participation portion of the subscription revenue, and
        the earned revenue based on subtracting the participation portion from the subscription revenue, and
    establishing, when participation revenue is not specified, the subscription revenue as the earned revenue.

4. The computer-implemented method of claim 1, wherein dynamically generating the conditioning coefficient further comprises:
    calculating a combined conditioning coefficient for the one or more content assets of the aggregation from multiple conditioning coefficients assigned to the one or more content assets.

5. The computer-implemented method of claim 4, wherein the combined conditioning coefficient is calculated based on averaging the multiple conditioning coefficients, or based on applying a weighted average to the multiple conditioning coefficients.

6. The computer-implemented method of claim 1, wherein calculating the distributed revenue portion further comprises determining whether usage allocations are enabled for allocation of the subscription revenue.

7. The computer-implemented method of claim 6, wherein, when usage allocations are enabled, calculating the distributed revenue portion further comprises:
    obtaining usage data for each content asset of the aggregation.

8. The computer-implemented method of claim 7, wherein the usage data further comprises a number of downloads or a number of streams in a time period.

9. The computer-implemented method of claim 7, wherein, when usage allocations are enabled, calculating the distributed revenue portion further comprises:
    calculating a percentage of total usage for each content asset of the aggregation, based on the usage data.

10. The computer-implemented method of claim 9, wherein, when usage allocations are enabled, calculating the distributed revenue portion further comprises:
    calculating percentage data based on applying the conditioning coefficient to the calculated percentage of total usage; and
    normalizing the percentage data.

11. The computer-implemented method of claim 10, wherein, when usage allocations are enabled, the distributed revenue portion is calculated using the normalized percentage data.

12. The computer-implemented method of claim 1, further comprising combining:
    an earned revenue portion calculated for each content asset, and a participation portion of the subscription revenue to be split evenly among all content assets in the content aggregation.

13. The computer-implemented method of claim 1, wherein:
receiving the coefficient driver values further comprises receiving a user input enabling a subset of the coefficient drivers using user interface controls associated with each of the coefficient drivers; and
the conditioning coefficient is dynamically set based on the enabled subset of the coefficient drivers only.

14. The computer-implemented method of claim 1, further comprising:
periodically reevaluating the conditioning coefficient;
determining, responsive to periodically reevaluating the conditioning coefficient, that the conditioning coefficient has fluctuated; and
outputting a report when determining that the conditioning coefficient has fluctuated.

15. The computer implemented method of claim 1, further comprising assigning a coefficient driver value to a coefficient driver, wherein the coefficient driver is specific to a source of digital content.

16. The computer implemented method of claim 15, wherein the coefficient driver further provides information concerning a market value of digital content associated with the digital content source.

17. The computer implemented method of claim 15, wherein the coefficient driver value is assigned within a predefined range.

18. The computer implemented method of claim 15, wherein:
the coefficient driver and the coefficient driver value are imported from contract provisions in electronically stored contracts; and
the coefficient driver value is updated by way of a computer network from remotely stored data sources.

19. The computer-implemented method of claim 1, wherein the one or more of the coefficient driver values further corresponds to a popularity ranking for the creator.

20. A system comprising:
one or more computers; and
a computer-readable medium coupled to the one or more computers having instructions stored thereon which, when executed by the one or more computers, cause the one or more computers to perform operations comprising:
determining a subscription revenue associated with an aggregation of content assets,
determining an earned revenue portion of the subscription revenue,
receiving coefficient driver values using a user interface, wherein one or more of the coefficient driver values correspond to a number of top ten songs for a creator of one or more of the content assets of the aggregation, a number of platinum records for the creator, a number of years the creator has been with a recording company, or a number of records produced by the creator,
dynamically generating a conditioning coefficient for the one or more content assets of the aggregation using the received coefficient driver values, wherein the conditioning coefficient is a value that is factored into a royalty payment made to the creator of the one or more content assets,
calculating a distributed revenue portion of the earned revenue portion using the dynamically generated conditioning coefficient, and
affecting a royalty payment made to the creator of the one or more of the content assets of the aggregation based on the distributed revenue portion.

21. The system of claim 20, wherein the one or more of the coefficient driver values further corresponds to a popularity ranking for the creator.

22. A computer storage medium encoded with a computer program, the program comprising instructions that when executed by data processing apparatus cause the data processing apparatus to perform operations comprising:
determining a subscription revenue associated with an aggregation of content assets;
determining an earned revenue portion of the subscription revenue;
receiving coefficient driver values using a user interface, wherein one or more of the coefficient driver values correspond to a number of top ten songs for a creator of one or more of the content assets of the aggregation, a number of platinum records for the creator, a number of years the creator has been with a recording company, or a number of records produced by the creator;
dynamically generating a conditioning coefficient for the one or more content assets of the aggregation using the received coefficient driver values, wherein the conditioning coefficient is a value that is factored into a royalty payment made to the creator of the one or more content assets;
calculating a distributed revenue portion of the earned revenue portion using the dynamically generated conditioning coefficient; and
affecting a royalty payment made to the creator of the one or more of the content assets of the aggregation based on the distributed revenue portion.

23. The computer storage medium of claim 22, wherein the one or more of the coefficient driver values further corresponds to a popularity ranking for the creator.

* * * * *

UNITED STATES PATENT AND TRADEMARK OFFICE
CERTIFICATE OF CORRECTION

PATENT NO. : 9,449,299 B2  
APPLICATION NO. : 12/121913  
DATED : September 20, 2016  
INVENTOR(S) : Huffman et al.

Page 1 of 1

It is certified that error appears in the above-identified patent and that said Letters Patent is hereby corrected as shown below:

In the Claims

Claim 15, Column 17, Line 20, delete "computer implemented" and insert --computer-implemented--, therefor.

Claim 16, Column 17, Line 24, delete "computer implemented" and insert --computer-implemented--, therefor.

Claim 17, Column 17, Line 28, delete "computer implemented" and insert --computer-implemented--, therefor.

Claim 18, Column 17, Line 31, delete "computer implemented" and insert --computer-implemented--, therefor.

Signed and Sealed this  
Third Day of January, 2017

Michelle K. Lee  
*Director of the United States Patent and Trademark Office*